G. H. BENJAMIN.
METHOD OF AND APPARATUS FOR DEHYDRATING VEGETABLE AND OTHER SUBSTANCES.
APPLICATION FILED JUNE 7, 1918.
1,284,218.
Patented Nov. 12, 1918.
2 SHEETS—SHEET 2.
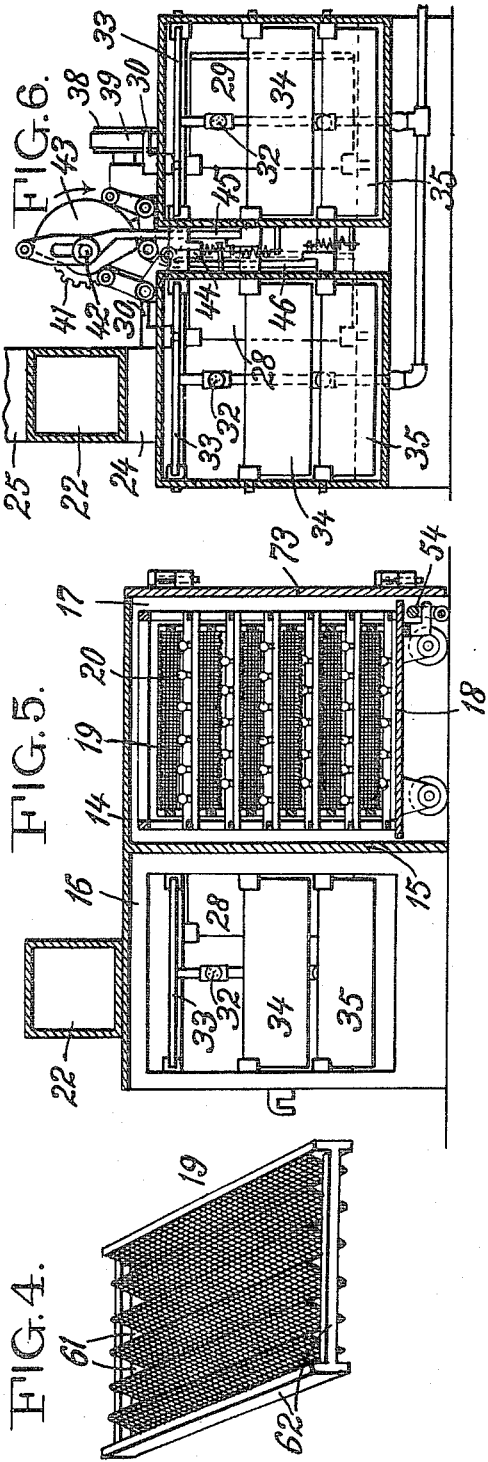
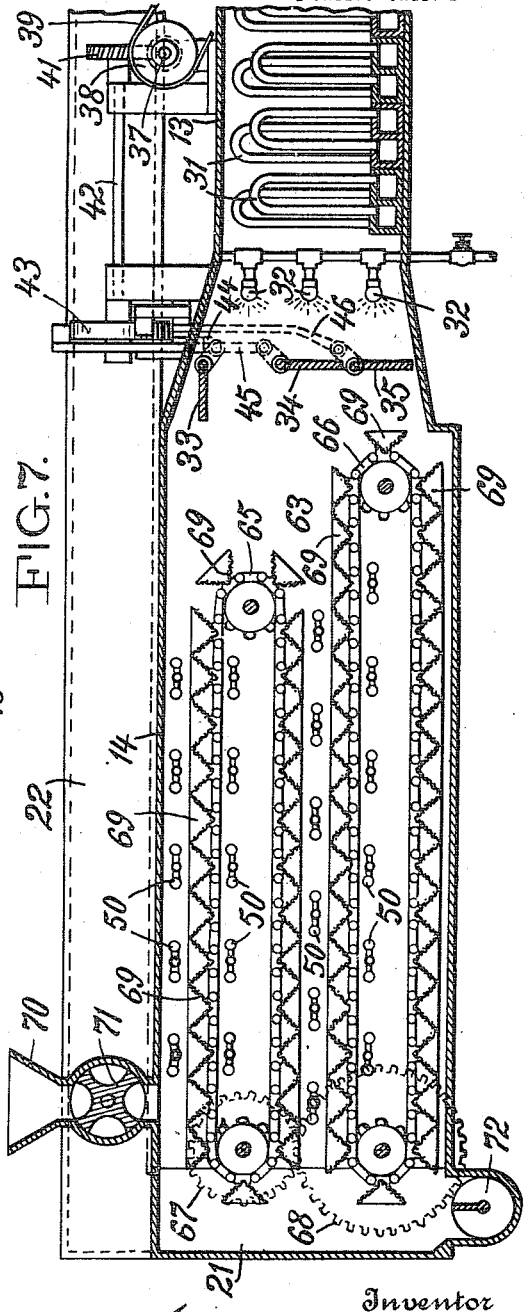
Inventor

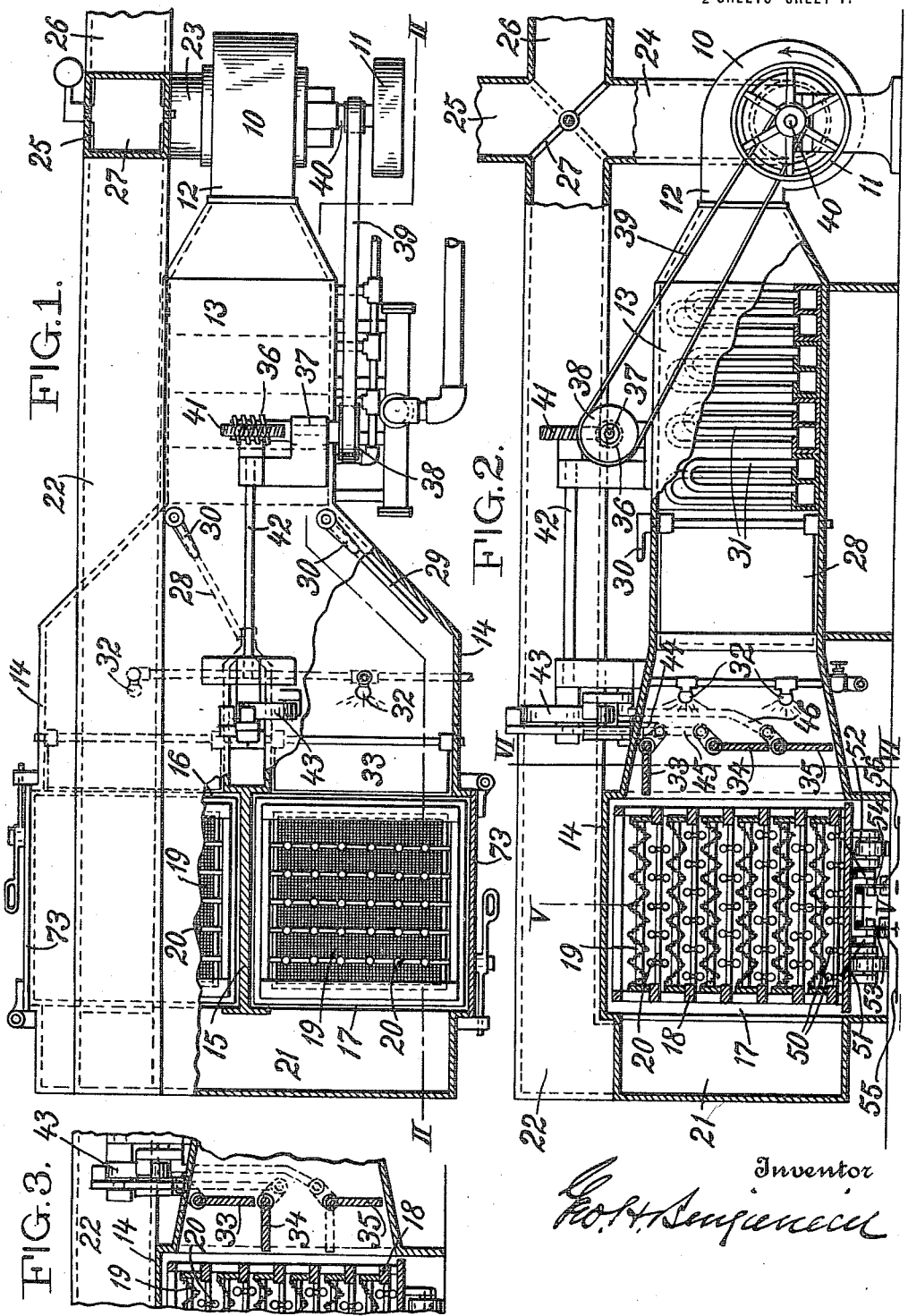

UNITED STATES PATENT OFFICE.

GEORGE HILLARD BENJAMIN, OF NEW YORK, N. Y.

METHOD OF AND APPARATUS FOR DEHYDRATING VEGETABLE AND OTHER SUBSTANCES.

1,284,218.   Specification of Letters Patent.   Patented Nov. 12, 1918.

Application filed June 7, 1918. Serial No. 238,638.

*To all whom it may concern:*

Be it known that I, GEORGE HILLARD BENJAMIN, a citizen of the United States, residing at New York, in the county and State of New York, have invented certain new and useful Improvements in Methods of and Apparatus for Dehydrating Vegetable and other Substances, of which the following is a specification.

My invention is based upon the following observed facts:

(a) That a body containing water will more readily exude water under the action of radiant heat, than by the application of other forms of applied heat, as for instance, convected heat.

(b) That exudation of moisture from a body, depends upon the degree of temperature employed, the time during which the temperature is applied, and the pressure exerted over the body.

(c) That rapid dehydration results if the body is alternately subjected to the successive action of radiant heat and wholly or partially dehydrated air currents.

(d) That the most effective and rapid dehydration, without physically or chemically affecting the structure of the material acted upon, is accomplished by subjecting the body acted on to the action of radiant heat and moving heated air currents, the heat being applied for twice the length of time the air currents are caused to pass over the body; or in other words, that the time required for exudation, under given conditions, is aproximately twice the length of time required to absorb the exuded water by air currents under given conditions.

I wish to have it understood that the above stated observed facts are not to be considered as invariable with all materials and under all conditions of practice, but will be modified by variations of material, *i. e.,* percentage of water contained, physical structure of the material, degree of temperature of the applied heat, the volume and speed of the air currents, and the means employed to apply the radiant heat and convected air currents.

The object of my invention, so far as the method is concerned, is to obtain a product which may be stored for any length of time and which may be brought back to its original condition by immersion in warm water, and by original condition I mean its original condition so far as relates to its structure, chemical and physical appearance; and so far as the apparatus is concerned, to the construction employed, by means of which the method above described may be most economically applied to produce a commercial product.

The accompanying drawings will serve to illustrate two forms which my apparatus may have, to carry out my invention, in which:

Figure 1 is a view, partially in plan and partially in horizontal section.

Fig. 2 is a view, partially in elevation and partially in vertical section, taken along the line II—II of Fig. 1.

Fig. 3 is a view, partially in vertical section and partially in horizontal section, taken along the same lines as Fig. 2, and intended to illustrate a different position of the controlling dampers from that shown in Fig. 2.

Fig. 4 is a perspective view of the trays employed in the construction shown in Figs. 1 to 5 inclusive.

Fig. 5 is a transverse vertical section taken on the line V—V of Fig. 2.

Fig. 6 is a transverse vertical section taken on the line VI—VI of Fig. 2.

Fig. 7 is a vertical elevation and longitudinal vertical section taken along substantially the same line as that shown in Fig. 2, but illustrating a modification of my apparatus, where the material to be dried is carried through the apparatus by means of moving belts, etc., instead of being supported upon removable trays, as in Figs. 1 to 6 inclusive.

In the drawings, 10 represents a blower driven from any suitable source of energy, through a pulley 11. The exit orifice 12 of the blower is connected to a casing, 13, which in turn is connected with a casing 14, divided by a partition 15 into two compartments 16 and 17, each of which is adapted to contain a wagon 18, carrying a series of superposed trays 19, and a series of electric heating devices 20. The casing 14 is connected at one end to a vertical casing 21, connected at its top to an exhaust air trunk 22, which in turn is connected to the inlet 23 of the blower 10 through flue 24 and to the external air through flues 25—26. 27 indicates a damper which may be placed either in the position shown in full lines (Fig. 2) in which case the air from the blower passes through the casings 13, 14 and 21, trunk 22, back to blower 10, being continuously circulated. Conversely, when the damper is in the position shown by dotted lines in Fig. 2, the air is drawn in through the flue 26 through the inlet of the blower, then through the casings and trays, then discharged into the atmosphere through the flue 25. Dampers 28 and 29 are provided for controlling admission of air to the trays in the compartments 16 and 17. When these dampers are in the position shown in full lines, Fig. 1, i. e., that of damper 29, the air from the blower will pass through both sets of trays; when the dampers are in the position shown in dotted lines, Fig. 1, i. e., that of damper 28, the air from the blower will not pass through either set of trays; when the dampers are in the position shown in Fig. 1, i. e., damper 28 closed and 29 opened, the air from the blower will pass through one set of trays and not through the other. These dampers can be moved as desired, by means of handles 30 on the top of the casing 14.

Situated within the casing 13, and in front of the exit orifice 12 of the blower 10, is a heater 31, which may be connected to any suitable source of steam or other heat, and in front of the heater, in casing 14, is a device 32 for vaporizing water. The character of this device may be any that is known and suitable for the purpose.

Mounted in front of the vaporizing device 32, are three dampers 33, 34, 35, adapted to have their positions changed as desired; for instance, when the dampers are in the position shown in Fig. 2, the air is passing along the top of the casing 14 and over the two uppermost trays on each wagon (supposing both dampers 28—29 to be open); when the dampers are in the position shown in Fig. 3, with the dampers 33—35 in the cut-off position, the air is supposed to be passing over the two center trays, and when the dampers 33—34 are in the cut-off position and the damper 35 in the open position, as shown by dotted lines, the air is supposed to be passing over the two lower trays. In practice I prefer that the movement of the dampers shall be such that each series of trays shall be cut off from the moving air currents for approximately twice the length of time they are exposed to the moving air currents, as I find, in practice, that it requires about twice the length of time to exude the amount of moisture which will be absorbed by the moving air currents in one half of the time.

I do not limit myself in any wise to the mechanism which may be used to move the dampers 33—34—35. A device suitable for the purpose is illustrated, and consists of a worm 36, mounted on horizontal shaft 37, driven through a pulley 38 and belt 39 from blower shaft 40. The motion communicated to the worm 36 is transmitted to worm wheel 41 on shaft 42. On the end of this shaft is a specially designed cam 43, which gives motion to the rods 44—45—46, as the cam is moved. The design of the cam is such that no motion is imparted to each rod separately during two thirds of its movement; thus, as above stated, provision is made for shifting a damper to permit the ingress of air for one minute, and allowing the damper to remain closed for two minutes, the dampers 33—34—35 moving in successive order. I wish it understood that I do not limit myself in any wise to the time of moving the dampers, as the time the dampers remain open or remain closed will depend upon many factors, as for instance, temperature, velocity of movement and pressure of the convected air currents, temperature of the radiant heat employed, characteristics of the material acted upon, so far as relates to exudation of moisture, etc.

The heating device 20 forming part of wagon 18, consists of a series of electric lamps 50, which are situated under and over the trays, and connected in parallel across the conductors 51—52 connected to the bottom of the car, which conductors are adapted to coöperate through switches 53—54 with terminal conductors 55—56 connected to a suitable source of electric energy. By means of a suitable rheostat, not shown, the current transmitted to the lamps can be modified as desired, so that more or less current may be passed through the lamps and the required degree of radiant heat regulated.

In Fig. 4 a perspective view of the trays employed, is shown. The bottom of the tray is made of wire gauze, bent to form the V-shaped cavities 61, this wire gauze being held in the frame 62. The reason for giving the bottom of the trays the shape illustrated, is to increase the surface and to facilitate the passage of the air through the trays. The electric lamps 50, shown in Fig. 2, are located in pairs under the base of each inverted V, formed in the bottom of the tray. I do not limit myself in any wise to the particular construction of the trays shown. The trays may be the ordinary trays with a flat bottom as commonly employed. I, however, consider the trays with the bottoms formed of a succession of inverted V's, preferable.

Referring now to Fig. 7; the construction there shown is substantially the same as that in Fig. 2, with the exception that instead of dividing the casing 14 into two receptacles, it is formed as a single receptacle 63, and this receptacle is provided with two linked belts 65—66, adapted to be driven at different speeds by means of the wheels 67—68. Connected to the link belts, that is, secured to each alternate link, are a series of V-shaped trays 69 formed of reticulate material. Situated in the top of the casing is a feed hopper 70 and feed wheel 71. The electric lights 50, in the construction shown in Fig. 7, are situated under and over each belt. Situated down at the left hand corner of the bottom of Fig. 7, is a worm 72, upon which the material received from the belt 66 is discharged from the machine. The receptacles 61 and 69 are closed by doors 73.

The operation of my improved device will be readily understood. The material to be heated is deposited on the trays 19 (Fig. 1) or on the receptacles 69 (Fig. 7). The air is then transmitted through the casings 13—14, passing over the heater 31, and thence over the material in the trays or receptacles; thence to vertical flue 21 to flue 22, back to the blower to be again circulated, or alternately discharged through flue 25 into the atmosphere. The horizontal level of the moving air currents across the trays or across the receptacles 69, is determined by the position of the dampers 33—34—35 at the time. As previously explained, the air in passing over the material on the trays or the receptacles 69, absorbs the exuded moisture. As soon as this moisture has been absorbed, the air current is cut off by closing the dampers. This relieves the material upon the trays or in the receptacles 69 from pressure, and allows exudation to be reëstablished, and simultaneously the damper is opened over another set of trays or receptacles, the opening and closing of the dampers being in successive order. At the same time the air currents are being directed in successive horizontal levels, radiant heat is generated at each series of trays or receptacles, by means of the electric lights 50. The radiant heat is absorbed by the material under treatment, which brings about exudation. At the same time the light rays serve to dissipate or break up what may be termed the fog vapors due to the absorption by the moving air currents, of the exuded moisture, the action of the light rays being very similar to the action of the sun upon fog. It is for this reason I prefer to use the electric lights as a means for generating radiant heat. Steam pipes or other forms of heated devices might be used to generate the radiant heat, but while transmitting mechanical heat rays these rays lack the velocity of mechanical electric light rays which act both as heat rays and as a means for dissipating moisture fog, and therefore facilitate rapid drying. Practice has demonstrated that hot fogs which are produced in dehydrating apparatus, through absorption of the moisture by the moving air currents, tend to hug or lie close to the material acted upon, and that the electric light rays break up these fogs, separate them, drive them away, and thus prevent them from acting as blankets or fog diaphragms to interfere with the action of the heat rays, whether the heat rays are radiated or convected.

Generally, I wish it understood that the apparatus which I have shown, is such as I think best adapted to carry my improved method into effect, but it will be manifest to those skilled in the art to which this invention belongs, that other apparatus may be used for the same purpose and without departing, to any considerable extent, from the steps of the method as hereinbefore outlined.

Having thus described my invention, what I claim is:

1. The method of dehydrating described, which consists in subjecting the body to be dehydrated to the action of radiant heat for a sufficient time to induce exudation of the contained moisture, and at intervals to the action of heated air currents.

2. The method of dehydrating described, which consists in subjecting the body to be dehydrated to the action of radiant heat for a sufficient time to induce exudation of the contained moisture, and at spaced intervals to the action of heated air currents.

3. The method of dehydrating described, which consists in subjecting the body to be dehydrated to the action of radiant heat for a sufficient time to induce exudation of the contained moisture, and at spaced intervals to the action of heated air currents, the air currents continued for sufficient length of time after each interval to absorb the exuded moisture from the body under treatment.

4. The method of dehydrating described, which consists in subjecting the body to be dehydrated to the simultaneous action of radiant heat and electric light for a sufficient time to induce exudation of the contained moisture and dissipate moisture fog in immediate proximity to the body under treatment, and at successive intervals to the action of heated air currents for sufficient time to pick up the exuded moisture.

5. The method of dehydrating described, which consists in subjecting the body to be dehydrated to the action of heat for a sufficient time to induce exudation of the contained moisture, and at successive intervals to the action of moving heated air currents to absorb the exuded moisture.

6. The method of dehydrating described, which consists in subjecting the body to be dehydrated to the action of radiant heat for a sufficient time to induce exudation of the contained moisture, and at successive intervals to the action of continued heat exhibited through partially dehydrated air currents to vaporize and absorb the exuded moisture.

7. The method of dehydrating described, which consists in subjecting the body to be dehydrated to the action of constantly applied radiant heat to induce exudation of the contained moisture and to intermittently applied partially dehydrated and heated air currents to absorb the exuded moisture present at the time of the application of the air currents.

8. In a dehydrating apparatus, the combination of a blower, a casing connected to the delivery orifice of the blower, an air heater in said casing, a series of receptacles for supporting the material to be dehydrated, a series of vertically disposed normally closed dampers situated between the blower and the material to be dehydrated, together with means for independently actuating said dampers whereby the air currents projected by the blower will be permitted, at intervals, to pass over the material to be dehydrated.

9. In a dehydrating apparatus, the combination of a blower, a casing connected to the delivery orifice of the blower, an air heater and a water spraying device in said casing, a series of receptacles for supporting the material to be dehydrated, a series of vertically disposed normally closed dampers situated between the blowers and the material to be dehydrated, together with means for independently actuating said dampers, whereby the air currents projected by the blower will be permitted, at intervals, to pass over the material to be dehydrated.

10. In a dehydrating apparatus, the combination of a blower, a casing connected to the delivery orifice of the blower, an air heater and a water spraying device in said casing, means for supporting the material to be dehydrated, a series of dampers interposed between said blower and said material to be dehydrated, together with means for automatically actuating said dampers in successive order and for holding each damper open for a determined limit of time before the opening of successive dampers.

11. In a dehydrating apparatus, the combination with receptacles for supporting the material to be dehydrated, of a series of electric lights so located as to transmit to the material to be dehydrated, radiant heat and electric light rays.

12. In a dehydrating apparatus and in combination with receptacles for holding the material to be dehydrated, said receptacles formed of a reticulate material constructed to form a series of V-shaped sections, a series of electric lights located in proximity to such V-shaped sections, and adapted to transmit radiant heat and electric light to the material in such receptacles.

In testimony whereof, I affix my signature.

GEORGE HILLARD BENJAMIN.